(12) United States Patent
Asai

(10) Patent No.: US 9,841,933 B2
(45) Date of Patent: Dec. 12, 2017

(54) COMPUTER-READABLE STORAGE MEDIUM STORING DISPLAY PROGRAM AND DISPLAY DEVICE

(71) Applicant: BROTHER KOGYO KABUSHIKI KAISHA, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 46 days.

(21) Appl. No.: 14/290,356

(22) Filed: May 29, 2014

(65) Prior Publication Data

US 2014/0355059 A1    Dec. 4, 2014

(30) Foreign Application Priority Data

May 31, 2013    (JP) ................................ 2013-115225

(51) Int. Cl.
    *G06F 3/12*    (2006.01)
(52) U.S. Cl.
    CPC .......... *G06F 3/1212* (2013.01); *G06F 3/1247* (2013.01); *G06F 3/1292* (2013.01)
(58) Field of Classification Search
    None
    See application file for complete search history.

(56) References Cited

U.S. PATENT DOCUMENTS

| | | | |
|---|---|---|---|
| 9,134,932 B2 | 9/2015 | Shiraga | |
| 9,405,496 B2 | 8/2016 | Sugiyama | |
| 2005/0219556 A1* | 10/2005 | Lee et al. | ........................ 358/1.1 |
| 2007/0133057 A1* | 6/2007 | Fukunishi | ..................... 358/1.18 |
| 2008/0059398 A1* | 3/2008 | Tsutsui | .............. G06F 17/30017 |
| 2008/0134024 A1* | 6/2008 | Masuda | ................ G06F 17/217 715/255 |
| 2008/0316521 A1* | 12/2008 | Lesage | ............... H04N 1/32614 358/1.14 |
| 2009/0044141 A1* | 2/2009 | Hayashi et al. | ............... 715/772 |
| 2009/0204686 A1* | 8/2009 | Yoda et al. | .................... 709/218 |

(Continued)

FOREIGN PATENT DOCUMENTS

| | | |
|---|---|---|
| JP | 2004-334674 A | 11/2004 |
| JP | 2007048235 A | 2/2007 |

(Continued)

OTHER PUBLICATIONS

Jan. 31, 2017—(JP) Notice of Reasons for Rejection—App 2013-115225.

*Primary Examiner* — Richa Mishra
(74) *Attorney, Agent, or Firm* — Banner & Witcoff, Ltd.

(57) ABSTRACT

An apparatus, such as a display device, may have a processor, memory storing computer-readable instructions, and a display portion. The apparatus may obtain one or more second files in response to converting a first file into the one or more second files. The plurality of second files may be obtained one by one. The apparatus may determine whether all of one or more selected files from among the one or more second files have been obtained, prior to obtaining all of the one or more second files. The one or more selected files may be a subset of the one or more second files. The apparatus may also output the one or more selected files in response to determining that all of the one or more selected files have been obtained.

16 Claims, 4 Drawing Sheets

(56) References Cited

U.S. PATENT DOCUMENTS

| | | | |
|---|---|---|---|
| 2010/0271652 A1 | 10/2010 | Sugiyama | |
| 2011/0007340 A1* | 1/2011 | Masuyama | G03G 15/5075 358/1.14 |
| 2011/0043844 A1* | 2/2011 | Fukuoka | 358/1.13 |
| 2011/0188078 A1* | 8/2011 | Tonegawa | G06F 3/12 358/1.15 |
| 2011/0279855 A1* | 11/2011 | Nagai et al. | 358/1.15 |
| 2012/0050797 A1* | 3/2012 | Tamura | H04N 1/00503 358/1.15 |
| 2012/0242689 A1 | 9/2012 | Miyata | |
| 2012/0246566 A1 | 9/2012 | Shiraga | |
| 2012/0287465 A1* | 11/2012 | Mizoguchi | G06F 3/1204 358/1.15 |
| 2013/0242334 A1* | 9/2013 | Ichida | G06F 3/1222 358/1.14 |
| 2013/0314744 A1* | 11/2013 | Yoda | G06K 15/002 358/1.15 |

FOREIGN PATENT DOCUMENTS

| | | |
|---|---|---|
| JP | 2007-152801 A | 6/2007 |
| JP | 2010-253840 A | 11/2010 |
| JP | 2012-203738 A | 10/2012 |
| JP | 2012-203745 A | 10/2012 |

\* cited by examiner

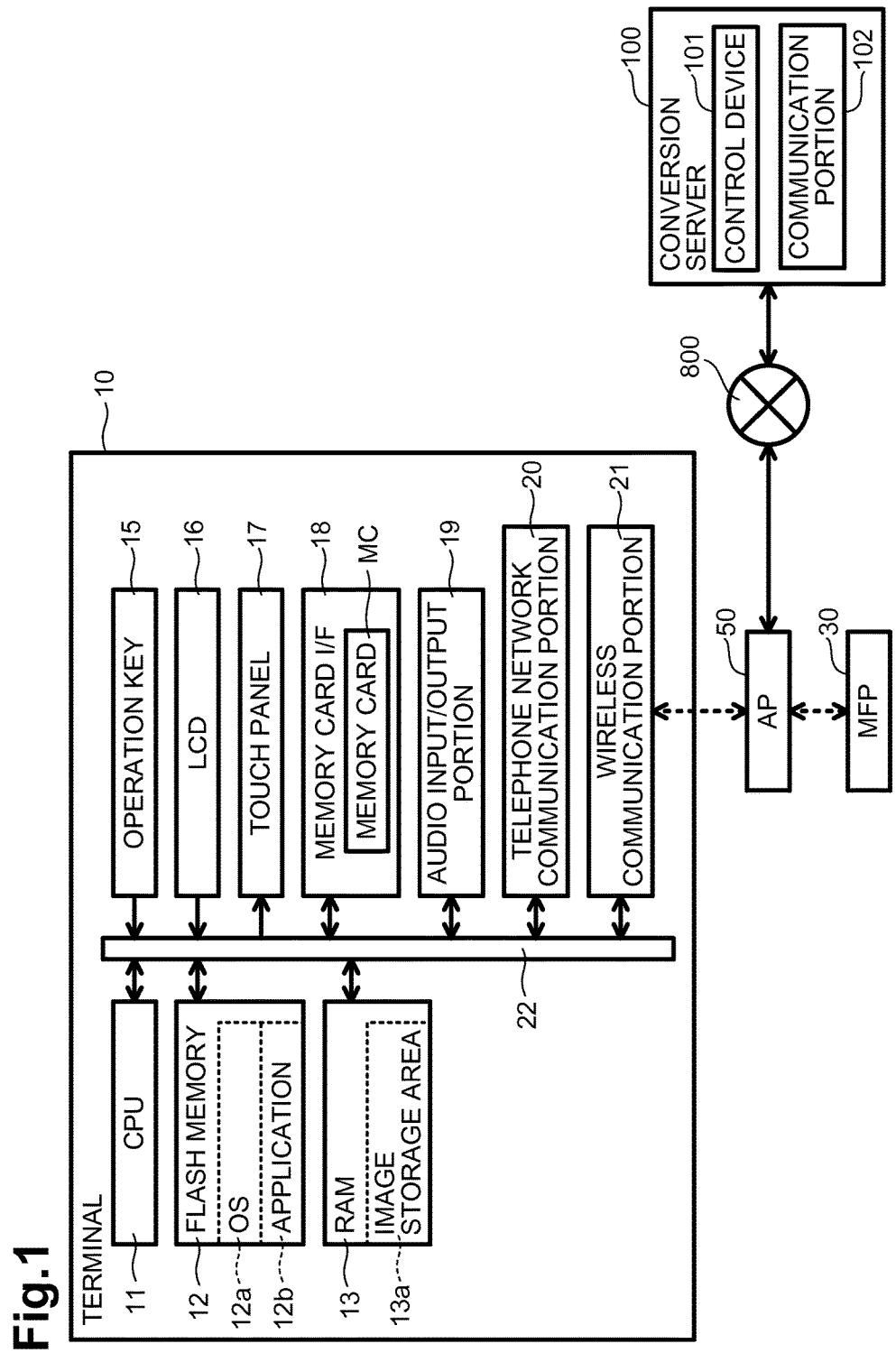

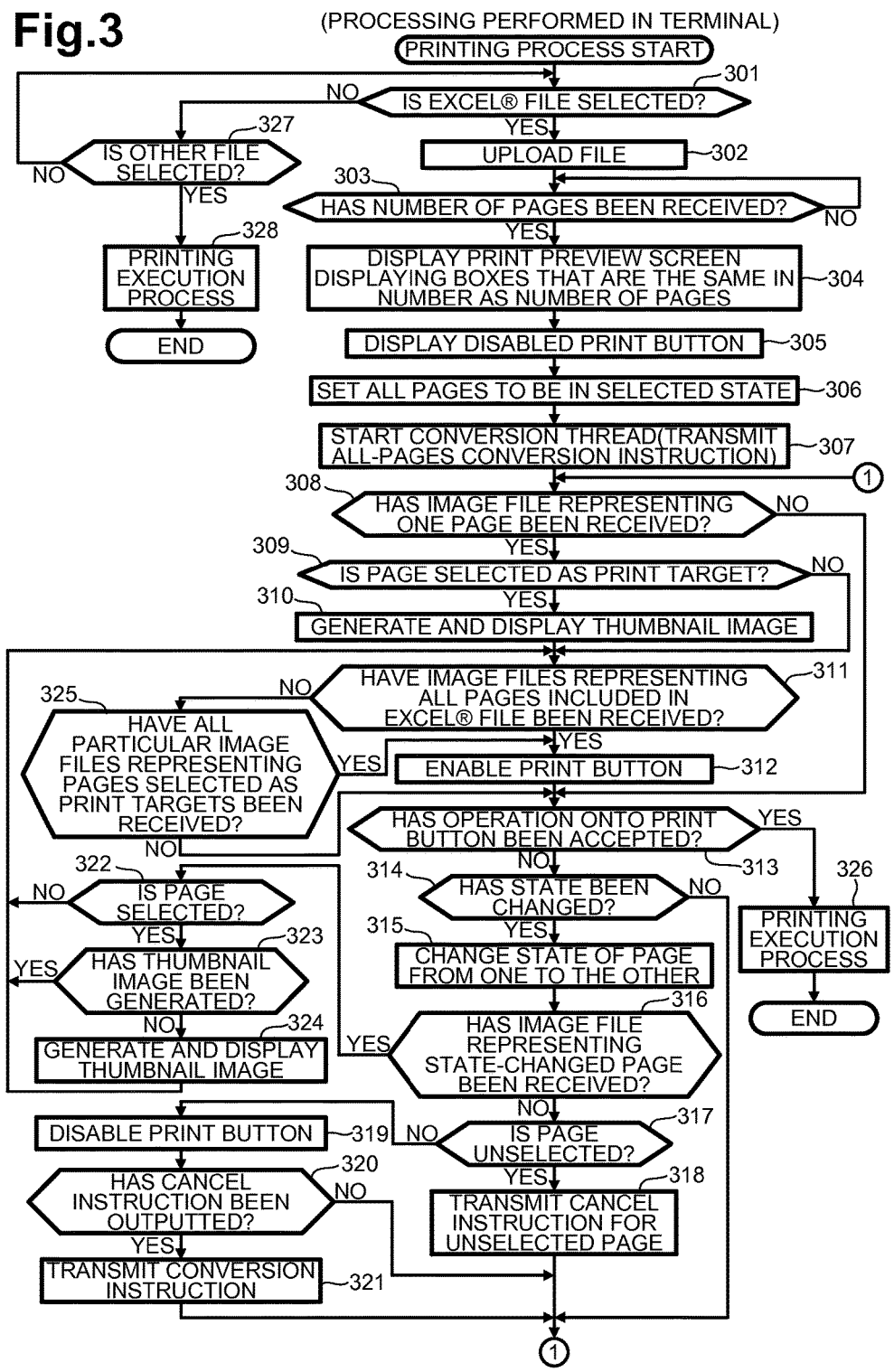

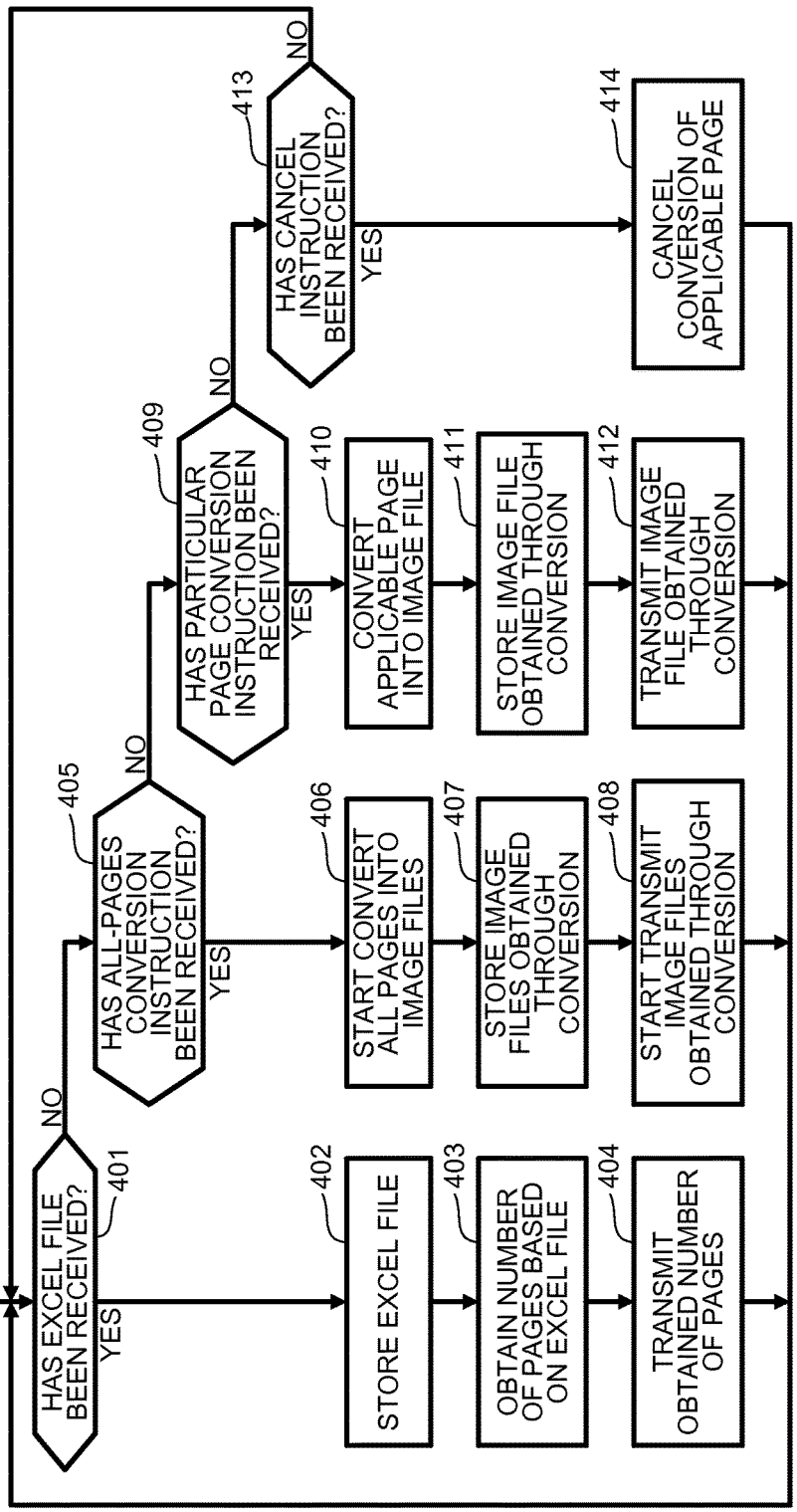

COMPUTER-READABLE STORAGE MEDIUM STORING DISPLAY PROGRAM AND DISPLAY DEVICE

CROSS-REFERENCE TO RELATED APPLICATION

This application claims priority from Japanese Patent Application No. 2013-115225, filed on May 31, 2013, which is incorporated herein by reference in its entirety.

FIELD OF DISCLOSURE

Aspects described herein relate to a computer-readable storage medium storing a communication support program and a display device.

BACKGROUND

There has been a technique of determining whether input data inputted into a terminal (e.g., a smartphone) is in a format that can be displayed on the terminal. In the known technique, when the input data is in a format that can be displayed on the terminal, the terminal displays the input data in the current format. When the input data is in a format that cannot be displayed on the terminal, the terminal transmits the input data to a server. The terminal then receives format-converted data from the server and displays the received data thereon.

BRIEF SUMMARY

According to the known technique, the terminal may be capable of displaying contents of the input data regardless of the format of the input data. In a case where format-converted data, obtained through conversion of input data, includes multiple pages, the terminal, however, may be prevented from performing a subsequent process, e.g., printing, until the terminal receives all the pages of the format-converted data.

Aspects described herein provide a computer-readable storage medium storing a display program and a display device that may enable a printing device to start printing at an earlier timing when the printing device is instructed to print one or more images based on one or more image files obtained through conversion of selected data.

According to aspects of the disclosure, a non-transitory computer-readable storage medium storing computer-readable instructions that, when executed by an apparatus (e.g., smartphone, tablet, computer, or other display device) comprising a display portion (e.g., a screen, monitor, etc.), may instruct or cause the apparatus to: obtain one or more second files as a result of a conversion of a first file into the one or more second files; prior to obtaining all of the one or more second files, determine whether all of one or more selected files from among the one or more second files have been obtained, the one or more selected files being a subset of the one or more second files; and output the one or more selected files in response to determining that all of the one or more selected files have been obtained.

According to additional aspects of the disclosure, an apparatus (e.g., a display device) may comprise: at least one processor; and a memory storing computer-readable instructions that, when executed by the at least one processor, instructs or causes the apparatus to: obtain one or more second files in response to converting a first file into the one or more second files; prior to obtaining all of the one or more second files, determine whether all of one or more selected files from among the one or more second files have been obtained, the one or more selected files being a subset of the one or more second files; and output the one or more selected files in response to determining that all of the one or more selected files have been obtained. The apparatus may further comprise a display, and the apparatus may display, on the display, a thumbnail image for each of the one or more second files in response to obtaining the one or more second files.

The one or more aspects of the disclosure may be accomplished in various manners, such as using control devices for controlling display devices, display systems, display methods, or recording media recording the computer-readable display programs, as well as using display devices.

According to the aspects of the disclosure, in a case where a plurality of second files are prepared on a page basis from a first file to be printed wherein the plurality of second files have a file format that may differ from a file format of the first file and the plurality of second files are obtained through conversion of the first file, an event (or predetermined output) associated with printing the print target may be performed on condition that all the print targets selected have been obtained. Thus, the predetermined output (e.g., activating or enabling a button or other option) associated with printing the print target may be performed without waiting for completion of the preparation of all the second files that may be converted from the first file. Therefore, printing may be started at an earlier timing.

This summary is not intended to identify critical or essential features of the disclosure, but instead merely summarizes certain features and variations thereof. Other details and features will be described in the sections that follow.

BRIEF DESCRIPTION OF THE DRAWINGS

Aspects of the disclosure are illustrated by way of example, and not by limitation, in the accompanying figures in which like reference characters may indicate similar elements.

FIG. 1 is a block diagram depicting an electrical configuration of a terminal in an illustrative embodiment according to one or more aspects of the disclosure.

FIG. 3 is a flowchart depicting an illustrative printing process according to one or more aspects of the disclosure.

FIG. 4 is a flowchart depicting an illustrative file conversion process according to one or more aspects of the disclosure.

DETAILED DESCRIPTION

Figure 2A:
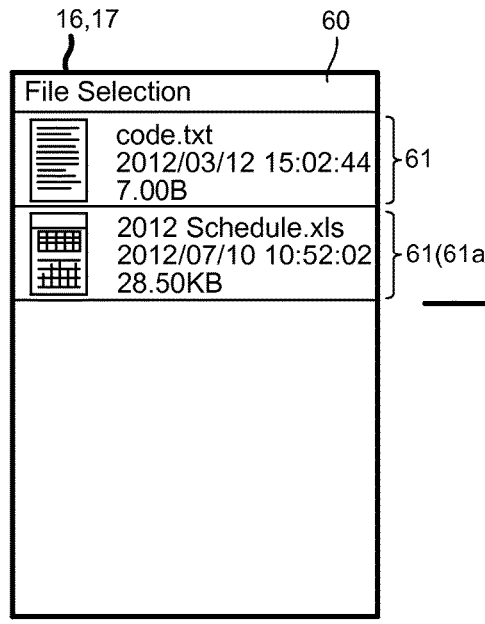
FIGS. 2A, 2B, 2C, and 2D each illustrate an example screen displayed on a crystal liquid display ("LCD") by an application according to one or more aspects of the disclosure.

For a more complete understanding of the present disclosure, needs satisfied thereby, and the objects, features, and advantages thereof, reference now is made to the following descriptions taken in connection with the accompanying drawings. Hereinafter, illustrative embodiments will be described with reference to the accompanying drawings. FIG. 1 is a block diagram depicting an electrical configuration of a terminal 10 having an application 12b installed thereon. The application 12b is an example of a display program. The application 12b may assist in the printing of a data file (e.g., an Excel® file generated using Excel® which is a registered trademark owned by Microsoft Corporation of Redmond, Wash.), such as a data file representing a spreadsheet. Herein, the data file may be referred to as an "Excel® file" to illustrate aspects of the disclosure. The terminal 10, having the application 12b installed thereon, may be configured to upload a data file selected by a user to a conversion server 100 and to allow the conversion server 100 to convert the file into image data (one or more image files). The terminal 10 is further configured to download the image data from the conversion server 100 and to allow a printer or other printing device, such as a multifunction peripheral ("MFP") 30, to print one or more images based on the image data. For example, one or more images may be printed based on the image data using a printing function of the MFP 30. The application 12b according to an illustrative embodiment may configure the terminal 10 to provide an early start to a printing process in a case where an Excel® file selected by the user is converted into image data by the conversion server 100.

In an illustrative embodiment, the terminal 10 includes a mobile terminal, e.g., a smartphone. The terminal 10 may include a central processing unit ("CPU") 11, a flash memory 12, a random-access memory ("RAM") 13, an operation key 15, a liquid crystal display 16 ("LCD") 16, a touch panel 17, a memory card interface ("I/F") 18, an audio input/output portion 19, a telephone network communication portion 20, and a wireless communication portion 21, which are connected with each other via a bus line 22.

The CPU 11 may be configured to control the portions connected thereto via the bus line 22, in accordance with fixed values and/or programs stored in the flash memory 12. The flash memory 12 may be a rewritable nonvolatile memory. The flash memory 12 may store an operating system ("OS") 12a and the application 12b. Hereinafter, where an action is described as being performed by a program, such as the application 12b and/or the operating system 12a, it should be understood that the action may be performed by the CPU 11 executing that program. For example, a reference to the "application 12b" may include the CPU 11 that executes the application 12b. The OS 12a may include basic software for implementing basic functionality of the terminal 10. The OS 12a used in the illustrative embodiment may be an Android™ OS (Android™ is a trademark owned by Google Inc. of Mountain View, Calif.).

The application 12b may be supplied by a vendor of a device and may be installed on the terminal 10 by a user. The installed application 12b may enable the terminal 10 to use the device. In an illustrative embodiment, the application 12b may enable the terminal 10 to use the MFP 30. The application 12b may enable the terminal 10 to direct (or instruct) the MFP 30 to perform printing, thereby bypassing use of a personal computer, for example. In an illustrative embodiment, in a case where an Excel® file is converted into a plurality of image files representing respective pages of the Excel® file, the application 12b may be configured to perform printing on condition that, of the plurality of image files, particular image files representing respective pages selected by the user as print targets have been obtained (prepared) even when the terminal 10 has not yet received all of the plurality of image files representing all the respective pages of the Excel® file from the conversion server 100. Process steps depicted in a flowchart of FIG. 3 may be performed by the CPU 11 in accordance with the application 12b. The flash memory 12 stores various print settings, for example, a sheet size and a sheet orientation when printing.

The RAM 13 may be a rewritable volatile memory. The RAM 13 may include an image storage area 13a allocated therein. The image storage area 13a may be configured to store image data that is obtained through conversion and is received from the conversion server 100. The operation key 15 may include a mechanical key (e.g., button) configured to allow the user to input an instruction into the terminal 10, and may be disposed, for example, on a housing of the terminal 10. The LCD 16 may include a liquid crystal display device configured to display various screens thereon. The touch panel 17 may be disposed on the LCD 16. The touch panel 17 may be configured to detect a contact or proximity of an instruction device, e.g., a finger or a stylus, to the touch panel 17 to input an instruction. The memory card I/F 18 may be configured to receive a rewritable nonvolatile memory card MC. The memory card I/F 18 may be further configured to control reading and writing of data or a file from and into the memory card MC. The audio input/output portion 19 may include an audio input/output device including a microphone and a speaker. The telephone network communication portion 20 may include a circuit configured to perform voice communication via a mobile telephone network (not depicted).

The wireless communication portion 21 may include an interface to allow the terminal 10 to perform wireless communication via a wireless local area network (LAN). In an illustrative embodiment, communication performed by the wireless communication portion 21 may include wireless communication via the wireless LAN in compliance with the IEEE 802.11 b/g standards. In an illustrative embodiment, the wireless communication portion 21 is configured to connect to a device, such as the MFP 30, via an access point ("AP") 50 that is a relay device, using wireless communication in compliance with a Wireless Fidelity ("Wi-Fi®") standard (Wi-Fi® is a registered certification mark owned by the Wi-Fi® Alliance of Austin, Tex.). Hereinafter, the wireless communication between the terminal 10 and the MFP 30 may be referred to as a "Wi-Fi® communication".

The AP 50 may be a relay device configured to relay Wi-Fi® communication between devices. The AP 50 may perform a broadband router function for connecting with a Wide Area Network (WAN) 800, such as the Internet. The MFP 30 may have multiple functions, e.g., a printing function, a scanning function, a facsimile function, and a copying function. The conversion server 100 may be configured to convert an Excel® file uploaded by the terminal 10 into image data (one or more image files) in a predetermined format. Various formats, e.g., JPEG, PNG, GIF, and BMP, are available for the format of the image data. In an illustrative embodiment, the conversion server 100 may convert an Excel® file into a plurality of image files in JPEG format. The conversion server 100 may include a control device 101 and a communication portion 102. The control device 101 may include a CPU, a ROM, and a RAM. The communication portion 102 may be configured to communicably connect the conversion server 100 to the terminal 10 via the Internet 800 and the AP 50.

FIGS. 2A, 2B, 2C, and 2D each illustrate an example screen displayed on the LCD 16 by the application 12b. FIG. 2A is a schematic diagram depicting an example of a file selection screen 60. The file selection screen 60 may allow the user to select a file to be printed. The file selection screen 60 may appear when the CPU 11 accepts, via the touch panel 17, a predetermined selecting operation (e.g., a touching operation) performed on a document printing menu on a printing menu screen (not depicted) that is displayed on the LCD 16 after the application 12b starts. The file selection screen 60 may display one or more fields 61 for one or more respective files that are selectable as a print target (e.g., all files stored on the terminal 10. There may be a one-to-one correspondence between selectable files and fields 61. A field 61 may display therein file information, e.g., a file name, and an icon, as information on a file associated with the field 61. In the example depicted in FIG. 2A, two fields 61 with which two files selectable as a print target are associated, respectively, are displayed on the file selection screen 60. When the CPU 11 accepts a selecting operation performed on one of the fields 61 displayed on the file selection screen 60, via the touch panel 17, the file associated with the selected field 61 is selected as a print target.

Figure 2B:
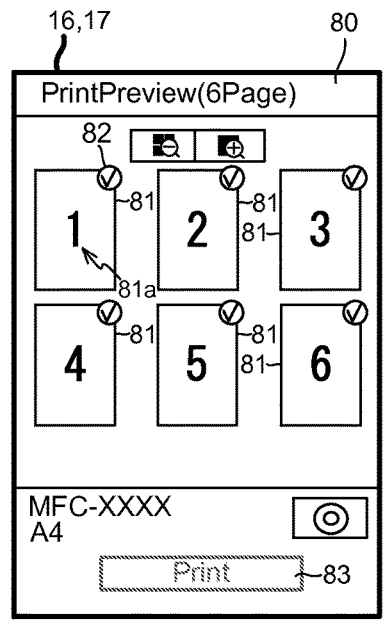
Figure 2C:
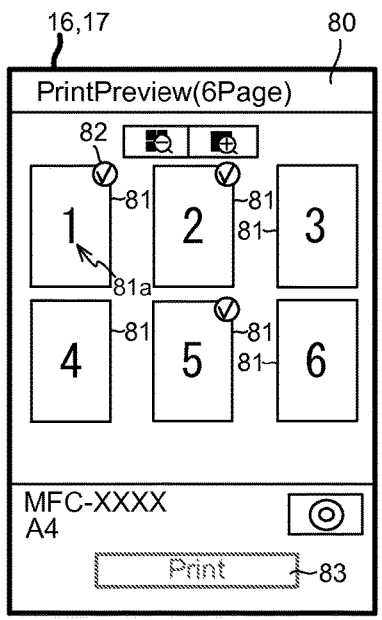
Figure 2D:
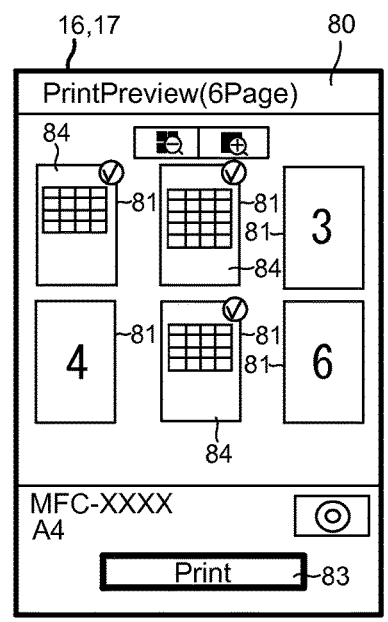

FIGS. 2B, 2C, and 2D each include a schematic diagram depicting an example print preview screen 80. The print preview screen 80 displays one or more preview images (hereinafter, referred to as a "print preview image") of one or more print images based on the file selected by the user on the file selection screen 60. FIGS. 2B, 2C, and 2D each illustrate a print preview screen 80 that is displayed when a field 61a, e.g., an Excel® file, is selected by the user on the file selection screen 60, as an example of the print preview screen 80.

When an Excel® file is selected by the user on the file selection screen 60, the terminal 10 may receive, from the conversion server 100, the total number of pages included in the Excel® file, that is, the total number of image files obtained through conversion of the Excel® file, prior to downloading of the image files converted from the Excel® file. Upon receipt of the total number of pages included in the Excel® file from the conversion server 100, the terminal 10 may display the print preview screen 80 as depicted in FIG. 2B. More specifically, the terminal 10 may display the print preview screen 80 including thumbnail boxes 81 that are the same in number as the total number of pages received from the conversion server 100. Each thumbnail box 81 may define a display area for a thumbnail image (e.g., a reduced image) representing an image file, which is one of the image files obtained through conversion. In some embodiments, as shown in the print preview screen 80 of FIG. 2B, the thumbnail boxes 81 might not initially include thumbnail images. Instead, a page number of an image file associated with a thumbnail box 81 may be displayed inside the thumbnail box 81. In the example depicted in FIG. 2B, six thumbnail boxes 81 for six pages are displayed. That is, this example illustrates a situation where the terminal 10 receives "6" from the conversion server 100, as the total number of pages included in the Excel® file.

A checkmark 82 may appear at an upper right corner of a thumbnail box 81. The checkmark 82 may indicate whether a page associated with a thumbnail box 81 is selected as a print target. That is, when a thumbnail box 81 is marked with a checkmark 82, this may signify that a page associated with the thumbnail box 81 marked with the checkmark 82 is selected as a print target. In comparison, when a thumbnail box 81 is not marked with a checkmark 82, this may signify that a corresponding page is not selected as a print target. In the illustrative embodiment, in an initial state, all the pages represented by all the image files, respectively, obtained through conversion may be selected as print targets. Therefore, on the initial-state print preview screen 80, as depicted in FIG. 2B, all the thumbnail boxes 81 may be marked with checkmarks 82, respectively.

A page selected as a print target may become unselected and an unselected page may become selected as a print target when the CPU 11 accepts a predetermined operation (e.g., a touching operation) performed onto an area within a corresponding thumbnail box 81, via the touch panel 17. In response to selecting or unselecting the page, the checkmark 82 may appear or disappear. FIG. 2C illustrates an example situation where pages 1, 2, and 5 of pages 1-6 represented by the respective image files are selected as print targets and pages 3, 4, and 6 are unselected. That is, when the CPU 11 accepts a touching operation performed onto an area within each of the thumbnail boxes 81 for pages 3, 4, and 6 on the print preview screen 80 depicted in FIG. 2B, the print preview screen 80 as depicted in FIG. 2C may appear.

As the terminal 10 downloads, from the conversion server 100, the image files representing the selected pages of all the pages obtained through the conversion of the Excel® file, as depicted in FIG. 2D, thumbnail images 84 may be generated based on the downloaded image files and displayed in the thumbnail boxes 81 appropriate for the thumbnail images 84, respectively. The thumbnail images 84 may be lower resolution images of the downloaded image files. The terminal 10 may be configured to download the image files, one by one, from the conversion server 100. A single image file may represent a single page of the pages included in the Excel® file. Thus, every time the terminal 10 downloads an image file representing a page, a thumbnail image 84 representing the downloaded image file may appear, one after another, in an appropriate one of the thumbnail boxes 81 displayed on the print preview screen 80.

The print preview screen 80 may include a "PRINT" button 83 for allowing the user to instruct a print execution. The "PRINT" button 83 may be disposed at a lower portion of the print preview screen 80. When the CPU 11 accepts a touching operation performed on the "PRINT" button 83 via the touch panel 17, a printing process may be performed while the pages associated with the respective thumbnail boxes 81 marked with the checkmarks 82 are determined as print targets. Thus, the pages associated with the respective thumbnail boxes 81 marked with the checkmarks 82 are printed by the MFP 30 using the printing function.

In an illustrative embodiment, the application 12b may disable (gray-out) the "PRINT" button 83 (e.g., the application 12b maintains the "PRINT" button 83 in a disabled state) until downloading of all the image files representing the pages associated with the respective thumbnail boxes 81 marked with the checkmarks 82 is completed. The application 12b may enable the "PRINT" button 83 (e.g., the application 12b changes the "PRINT" button 83 to an enabled state from the disabled state) on condition that the downloading of all the image files representing the pages associated with the respective thumbnail boxes 81 marked with the checkmarks 82 is completed. Enabling the "PRINT" button 83 may enable the CPU 11 to accept a predetermined operation (e.g., a touching operation) performed on the "PRINT" button 83. Disabling the "PRINT" button 83 may disenable (e.g., prevent) the CPU 11 from accepting the predetermined operation performed on the "PRINT" button 83. For example, as depicted in FIGS. 2B and 2C, the "PRINT" button 83 may be kept disabled in a state where the thumbnail images 84 have not been displayed yet in the respective thumbnail boxes 81 marked with the checkmarks 82, that is, in a state where the image files representing the pages associated with the thumbnail boxes 81 have not been downloaded yet from the conversion server 100. For example, as depicted in FIG. 2D, when, of the image files representing pages 1-6, downloading of particular image files representing pages 1, 2, and 5 selected as print targets is completed as the downloading proceeds, the disabled "PRINT" button 83 may become enabled. That is, the disabled "PRINT" button 83 may become enabled without waiting for the completion of the downloading of all the image files representing pages 1-6. According to the application 12b, in an illustrative embodiment, the "PRINT" button 83 may become enabled on condition that the downloading of all the image files representing the particular pages selected as print targets is completed. Therefore, the application 12b according to an illustrative embodiment may enable an earlier start of printing without waiting for the completion of the downloading of all the image files representing all the pages obtained through the conversion of the Excel® file, including one or more image files representing one or more pages that are not selected as print targets.

As described above, prior to the obtainment of the image files converted from the Excel® file, the terminal 10 may receive the total number of pages included in the Excel® file and displays the thumbnail boxes 81 that are the same in number as the total number of pages received. Therefore, the terminal 10 may allow the user to select one or more desired pages to be printed at an earlier timing from all the pages associated with the thumbnail boxes 81, as compared with a case where the total number of pages is counted after the terminal 10 obtains all the image files that are obtained through the conversion. In this case, as depicted in FIG. 2C, the terminal 10 may allow the user to select any of one or more desired pages to be printed at an earlier timing from all the pages associated with the thumbnail boxes 81. For example, the one or more desired pages to be printed may be inconsecutive pages and/or later pages in the Excel® file. Thus, the application 12b may enable an earlier start of printing of the one or more desired pages, thereby improving a speed of a print job, increasing productivity, and/or increasing usability.

FIG. 3 is a flowchart depicting an illustrative printing process. The printing process may be performed by the CPU 11 of the terminal 10 in accordance with the application 12b. For example, the CPU 11 of the terminal may execute an algorithm, as shown in FIG. 3, of the application 12b to perform the printing process. The printing process starts in response to a selection of document printing on a printing menu screen (not depicted) after the application 12b starts. The CPU 11 waits to accept a selecting operation for selecting a file performed on the file selection screen 60 (e.g., NO in step S301 and NO in step S327). When the CPU 11 accepts a selecting operation for selecting a file and determines that the file selected in the selecting operation is a file other than an Excel® file (e.g., NO in step S301 and YES in step S327), the CPU 11 performs a printing execution process in accordance with the selected file (e.g., step S328), and ends the printing process.

When the CPU 11 accepts a selecting operation for selecting a file and determines that the file selected in the selecting operation is an Excel® (e.g., .xls, .xlsx, etc.) file (e.g., YES in step S301), the CPU 11 may transmit the selected Excel® file to the AP 50 via the wireless communication portion 21 through Wi-Fi® communication to upload the Excel® file to the conversion server 100 via the Internet 800 (e.g., step S302). In step S302, the CPU 11 may transmit the print settings stored in the flash memory 12 to the conversion server 100 as well as the Excel® file. Based on the Excel® file and the print settings received from the terminal 10, the conversion server 100 may analyze the Excel® file. On the basis of the analysis, the conversion server 100 may obtain the total number of pages included in the Excel® file. The conversion server 100 may transmit, to the terminal 10, the total number of pages obtained based on the analysis of the Excel® file.

After uploading the Excel® file to the conversion server 100, the CPU 11 may wait to receive the total number of pages included in the Excel® file from the conversion server 100 (e.g., NO in step S303). When the CPU 11 receives the total number of pages from the conversion server 100 (e.g., YES in step S303), the CPU 11 may display a print preview screen 80 displaying one or more thumbnail boxes 81 that are the same in number as the total number of pages received, on the LCD 16 (e.g., step S304). The CPU 11 may display the disabled (grayed-out or invisible) "PRINT" button 83 on the print preview screen 80 (e.g., step S305). The CPU 11 may set all the pages represented by the respective image files obtained through the conversion of the Excel® file, to be in a selected state in which the pages are selected as print targets (e.g., step S306). In response to this, the CPU 11 may put checkmarks 82 next to all the thumbnail boxes 81 displayed on the print preview screen 80. Through the performance of steps S304 to S306, for example, the print preview screen 80 depicted in FIG. 2B may be displayed.

Subsequent to step S306, the CPU 11 may transmit an all-pages conversion instruction targeted for the Excel® file uploaded in step S302 to the conversion server 100 and starts a conversion thread that is performed by the CPU 11 in concurrently with but in asynchronization with the printing process (e.g., step S307). The all-pages conversion instruction may instruct the conversion server 100 to convert all the pages included in the uploaded file into image files. The all-pages conversion instruction includes an identification number (hereinafter, referred to as a "conversion ID") that identifies the uploaded Excel® file. The CPU 11 may receive the identification number from the conversion server 100 after the CPU 11 uploads the Excel® file. In response to receipt of the all-pages conversion instruction, the conversion server 100 may convert, one by one, all the pages included in the Excel® file identified by the conversion ID, that is, all the pages included in the Excel® file uploaded in step S302, into image files in JPEG format, in accordance with the received print settings. The CPU 11 may download the image files obtained through the conversion, one by one, from the conversion server 100, using the conversion thread, and store the obtained image files in the image storage area 13a.

Subsequent to step S307, the CPU 11 may determine whether an image file representing a page has been received (e.g., step S308). When the CPU 11 determines that an image file representing a page has not been received (e.g., NO in step S308), the routine may proceed to step S313. When the CPU 11 determines that an image data representing a page has been received (e.g., YES in step S308), the CPU 11 may determine whether the page represented by the received image file is selected as a print target (e.g., step S309). When the CPU 11 determines that the page represented by the received image file is selected as a print target (e.g., YES in step S309), the CPU 11 may generate a thumbnail image 84 for the page based on the image file and the print settings. Then, the CPU 11 may display the generated thumbnail image 84 in a corresponding one of the thumbnail boxes 81 (e.g., step S310), and the routine may proceed to step S311.

In step S309, when the CPU 11 determines that the page represented by the received image file is not selected as a print target, that is, the page represented by the received image file is a page other than the page selected as a print target (e.g., NO in step S309), the routine may skip step S310 and proceed to step S311. When the image file downloaded from the conversion server 100 is an image file representing a page that is not selected as a print target, the CPU 11 might not generate and/or display a thumbnail image 84 for the unselected page, thereby suppressing an increase of processing load by the CPU 11. When the received image file represents a page that is not selected as a print target, the routine may skip step S310. Thus, a process involved in a preparation of an image file required to be prepared (e.g., an image file representing the page selected as a print target) may be started at an earlier timing.

In step S311, the CPU 11 may determine whether the image files representing all the respective pages included in the selected Excel® file have all been received. When the CPU 11 determines that the image files representing all the respective pages included in the selected Excel® file have all been received (e.g., YES in step S311), the CPU 11 may enable the "PRINT" button 83 (e.g., step S312), and the routine may proceed to step S313. After the "PRINT" button 83 is enabled in step S312, the CPU 11 may accept a predetermined operation (e.g., a touching operation) performed on the "PRINT" button 83.

When the CPU 11 determines that the image files representing all the respective pages included in the selected Excel® file have not all been received (e.g., NO in step S311), the CPU 11 may determine whether the particular image files representing the respective pages selected as print targets have all been received (e.g., step S325). When the CPU 11 determines that the particular image files representing the respective pages selected as print targets have all been received (e.g., YES in step S325), the routine may proceed to step S312 and the CPU 11 may enable the "PRINT" button 83. According to the application 12b, in an illustrative embodiment, the "PRINT" button 83 may become enabled (or activated) on condition that the particular image files representing the respective pages selected as print targets are all received even when the image files representing the respective pages included in the selected file have not all been received yet. Therefore, printing of the selected image files may be started without waiting for the completion of the downloading of all the image files obtained through the conversion of the Excel® file. In step S325, when the CPU 11 determines that the particular image files representing the respective pages selected as print targets have not all been received yet (e.g., NO in step S325), the routine may proceed to step S313. Therefore, such a configuration may prevent the CPU 22 from accepting the predetermined operation performed on the "PRINT" button 83 without receiving all the image files representing the respective pages selected as print targets.

In step S313, the CPU 11 may determine whether an operation performed on the "PRINT" button 83 has been accepted (e.g., step S313). When the CPU 11 determines that an operation performed on the "PRINT" button 83 has been accepted (e.g., step YES in S313), the CPU 11 may perform the printing execution process (e.g., step S326), and may end the printing process. More specifically, in the printing execution process (e.g., step S326), the CPU 11 may transmit, to the MFP 30, print data including the image file representing the page selected as a print target and the print settings stored in the flash memory 12, from the wireless communication portion 21 via the AP 50. Upon receipt of the print data, the MFP 30 may perform printing of an image based on the print data, using the printing function (e.g., a printer unit). In other embodiments, for example, in step S313, the CPU 11 may be configured to generate print data based on the image file representing the page selected as a print target and the print settings and to transmit the generated print data to the MFP 30.

When the CPU 11 determines that an operation performed on the "PRINT" button 83 has not been accepted (e.g., NO in step S313), the CPU 11 may determine whether the current state, which indicates whether or not the page has been selected as a print target, of one of the thumbnail boxes 81 displayed on the print preview screen 80 has been changed to the other state (e.g., step S314). More specifically, when the CPU 11 accepts the predetermined operation (e.g., a touching operation) performed on an area within one of the thumbnail boxes 81 displayed on the print preview screen 80, the CPU 11 may make a positive determination (e.g., YES) in step S314. When the CPU 11 makes a positive determination in step S314 (e.g., YES in step S314), the CPU 11 may change the state that indicates whether or not the page has been selected as a print target, from one to the other (e.g., step S315). That is, when the page has been selected as a print target, the CPU 11 may unselect the page (e.g., change the state to the unselected state from the selected state). When the page has not been selected as a print target, the CPU 11 may select the page as a print target (e.g., changes the state to the selected state from the unselected state). In response to the processing of step S315, the CPU 11 may display or dismiss a checkmark 82 for the thumbnail box 81 representing the applicable page in accordance with the changed state on the print preview screen 80.

Subsequent to step S315, when the image file representing the state-changed page has already been received and the page is selected as a print target this time (e.g., the state of the page is changed to the selected state from the unselected state) (e.g., YES in step S316 and YES in step S322), the CPU 11 may determine whether a thumbnail image 84 for the page has been generated (e.g., step S323). When the CPU 11 determines that a thumbnail image 84 has not been generated yet (e.g., NO in step S323), the CPU 11 may generate a thumbnail image 84 based on the image file representing the page and the print settings. The CPU 11 may display the generated thumbnail image 84 in a corresponding one of the thumbnail boxes 81 (e.g., step S324) and the routine may proceed to step S311. When a thumbnail image 84 has already been generated (e.g., YES in step S323), it is unnecessary to generate another thumbnail image 84 for the page. Therefore, the routine may proceed to step S311. When the image file representing the state-changed page has already been received and the page is unselected this time (e.g., the state of the page is changed to the unselected state from the selected state) (e.g., YES in step S316 and NO in step S322), it may be unnecessary to display the thumbnail image 84 for the page, and thus, the routine may proceed to step S311.

When the image file representing the state-changed page has not been received yet and the page is unselected this time (e.g., the state of the page is changed to the unselected state from the selected state) (e.g., NO in step S316 and YES in step S317), the CPU 11 may transmit a cancellation instruction targeted for the applicable page to the conversion server 100 (e.g., step S318), and the routine may proceed to step S308. In step S318, the CPU 11 may store the page that is the target of the conversion cancellation in a predetermined storage, e.g., the RAM 13. The cancellation instruction may include the conversion ID, and a page ID that identifies the target page of the conversion cancellation. In response to the cancellation instruction transmitted from the terminal 10, the conversion server 100 may cancel the conversion process of the page identified with the page ID, that is, the page that is unselected this time, of the pages constituting the Excel® file designated with the conversion ID. Thus, the conversion server 100 may perform the conversion of the pages selected as print targets with higher priority. Therefore, the terminal 10 may receive the image files required to be prepared (e.g., the image files representing the pages selected as print targets) with higher priority. Further, the terminal 10 does not download the image file representing the unselected page, thereby receiving the image files required to be prepared at an earlier timing. Thus, the terminal 10 may be allowed to start a preparation of the image file required to be prepared at an earlier timing.

When the image file representing the state-changed page has not been received yet and the page is selected as a print target this time (e.g., the state of the page is changed to the selected state from the unselected state) (e.g., NO in step S316 and NO in step S317), the CPU 11 may disable the "PRINT" button 83 (e.g., step S319). If a page represented by an unreceived image file is selected as a print target, the "PRINT" button 83 may become disabled in step S319 even when the "PRINT" button 83 has been enabled immediately before the state of the page is changed to the selected state from the unselected state. Therefore, such a configuration may avoid the CPU 11 from accepting the predetermined operation performed on the "PRINT" button 83 without receiving all the image files representing the respective pages selected as print targets.

When the CPU 11 has already outputted the cancellation instruction to cancel the conversion of the page to the conversion server 100 (e.g., YES in step S320), the CPU 11 may transmit a conversion instruction (hereinafter, referred to as a "particular page conversion instruction") to convert the target page to the conversion server 100 (e.g., step S321), and the routine may proceed to step S308. When the target page has already been stored in the predetermined storage, e.g., the RAM 13, as a page subjected to cancel, the CPU 11 may make a positive determination (e.g., YES) in step S320. The conversion instruction may include the conversion ID and a page ID that identifies the page to be converted. In response to the particular page conversion instruction transmitted from the terminal 10, the conversion server 100 converts the page identified by the page ID, that is, the page selected as a print target this time, of the pages constituting the Excel® file designated by the conversion ID, into an image file. When the CPU 11 receives the image file obtained through the conversion of the target page from the conversion server 100 using the conversion thread, the CPU 11 may store the received image file in the image storage area 13a. Thus, such a configuration may enable receipt of the image file representing the page that has been cancelled to be converted into the image file by the cancellation instruction if the page is selected as a print target again.

When the CPU 11 has not yet outputted a cancellation instruction to cancel the conversion of the page to the conversion server 100 (e.g., NO in step S320), the conversion of the page into an image file might not have been cancelled yet, and thus, the routine may proceed to step S308. According to steps S316 to S318, and S321, when the state of an image file representing the unprepared page (e.g., the image file that has not been downloaded from the conversion server 100) is changed from one state to the other state between the selected state and the unselected state, an appropriate instruction is transmitted to the conversion server 100 in accordance with the post-changed state. Thus, the application 12b may control the downloading of the image file from the conversion server 100 appropriately.

FIG. 4 is a flowchart depicting a file conversion process. The file conversion process is performed by the control device 101 of the conversion server 100. The file conversion process is repeatedly performed while the power of the conversion server 100 is on. When the conversion server 100 receives an Excel® file (e.g., YES in step S401), the control device 101 stores the received Excel® file in a storage (not depicted) of the conversion server 100, in association with a conversion ID that identifies the Excel® file (e.g., step S402). The control device 101 may analyze the received Excel® file to obtain the total number of pages constituting the Excel® file (e.g., step S403). The control device 101 may transmit the obtained total number of pages to the device that has transmitted the Excel® file to the conversion server 100 (e.g., step S404), and the routine may proceed to step S401. In a case where the terminal 10 uploads an Excel® file in step S302, the terminal 10 may receive the total number of pages that is transmitted from the conversion server 100 in step S404. In step S404, the control device 101 may also provide the terminal 10 with the conversion ID for the uploaded file. The terminal 10 may transmit various instructions targeted for the Excel® file identified by the conversion ID, to the conversion server 100, using the conversion ID received from the conversion server 100.

When the conversion server 100 receives an all-pages conversion instruction (e.g., NO in step S401 and YES in step S405), the control device 101 may convert all the pages constituting the Excel® file identified by the conversion ID that has been received with the all-pages conversion instruction, into image files on a page basis (e.g., step S406). The control device 101 stores the image files obtained through the conversion in the storage in association with the conversion ID of the original file (e.g., step S407). The control device 101 may start a process of transmitting, one by one, the image files obtained through the conversion to the terminal that has transmitted the all-pages conversion instruction (e.g., step S408). After starting the process of transmitting the image files one by one, the routine may return to step S401. When the terminal 10 transmits an all-pages conversion instruction in step S307, the terminal 10 may begin to receive, one by one, the image files that are transmitted from the conversion server 100 in step S408. In an illustrative embodiment, the control device 101 may be configured to convert all the pages into the image files and then begin the process of transmitting the image files one by one. Nevertheless, in other embodiments, for example, the control device 101 may be configured to transmit an image file one after another every time a conversion of one page is completed while performing the conversion of all the pages into image files one by one.

When the conversion server 100 receives a particular page conversion instruction (e.g., NO in step S405 and YES in step S409), the control device 101 may convert a page subjected to conversion due to the particular page conversion instruction, of the pages constituting the Excel® file identified by the conversion ID received with the particular page conversion instruction, into an image file (e.g., step S410). The control device 101 may store the image file representing the particular page in the storage in association with the conversion ID of the original file (e.g., step S411). The control device 101 may transmit the image file obtained through the conversion, to the terminal that has transmitted the particular page conversion instruction (e.g., step S412), and the routine may proceed to step S401. When the terminal 10 transmits a particular page conversion instruction in step S321, the terminal 10 may receive an image file representing the particular page that is transmitted from the conversion server 100 in step S411.

When the conversion server 100 receives a cancellation instruction (e.g., NO in step S409 and YES in step S413), the control device 101 may cancel the conversion of a particular page, which is a target of the cancellation, of the pages constituting the Excel® file identified by the conversion ID that has been received with the cancellation instruction (e.g., step S414), and the routine may return to step S401. When the terminal 10 transmits a cancellation instruction in step S318, the conversion server 100 may cancel the conversion of the applicable page into an image file. When the conversion server 100 has not received the cancellation instruction (e.g., NO in step S413), the routine may return to step S401.

According to an illustrative embodiment, the "PRINT" button 83 may become enabled on condition that, of the image files representing all the respective pages converted from the Excel® file, the image files representing the pages selected as print targets have been prepared, that is, the image files representing the pages selected as print targets have been received from the conversion server 100. This state change of the "PRINT" button 83 into the enabled state enables printing of the image files. With this configuration, printing of the pages desired to be printed by the user may become available without waiting for completion of preparation of all the image files representing all the pages included in the Excel® file. Therefore, the application 12b may enable an earlier start of printing of the desired pages, thereby increasing usability.

After uploading the Excel® file, the terminal 10 may receive the total number of pages included in the Excel® file prior to receiving the image files obtained through the conversion. Therefore, the user may confirm how many image files (e.g., pages) will be obtained in total through the conversion at an earlier timing. This configuration may allow the user to select a later page of all the pages represented by the image files, as a print target, thereby enabling printing of a desired page to start earlier. Also, for example, in a case where there are multiple pages and the user desires to print the first page only, such a configuration may enable the user to perform printing of the first page without waiting completion of downloading of an image file representing the last page.

In an illustrative embodiment, the application 12b is an example of the display program. The terminal 10 is an example of a display device. The conversion server 100 is an example of an external device. The LCD 16 is an example of a display portion. The CPU 11 is an example of a control device. The wireless communication portion 21 is an example of a communication portion. The MFP 30 is an example of a printing device. The Excel® file is an example of a first file. The image file converted from the Excel® file is an example of a second file. The print preview screen 80 is an example of a screen for allowing the user to select one or more second files as one or more print targets from a plurality of second files. The "PRINT" button 83 is an example of an instruction device. The thumbnail image 84 is an example of a thumbnail image based on the second file representing one page. The cancellation instruction is an example of a first instruction. The particular page conversion instruction is an example of a second instruction.

The CPU 11 that performs the processing of step S302 is an example of a file preparation device and an example of an uploading device. The CPU 11 that performs the processing of step S307 is another example of the file preparation device and an example of a downloading device. The CPU 11 that performs the processing of steps S314 and S315 is an example of a selecting device and an example of a selection cancelling device. The CPU 11 that performs the processing of steps S311, S312, and S325 is an example of an output control device. The CPU 11 that performs the processing of step S303 is an example of a page count obtaining device.

The CPU 11 that performs the processing of step S304 is an example of a screen display device. The CPU 11 that performs the processing of step S326 is an example of a printing device. The CPU 11 that performs the processing of step S319 is an example of an instruction device control device. The CPU 11 that performs the processing of step S316 is an example of a determining device. The CPU 11 that performs the processing of steps S317, S318, and S321 is an example of a preparation control device. The CPU 11 that performs the processing of steps S309 and S310 is an example of a thumbnail image display device.

While the disclosure has been described in detail with reference to specific embodiments, they are merely examples, and various changes, arrangements and modifications may be applied therein without departing from the spirit and scope of the disclosure. For example, in some embodiments, steps may be combined, omitted or skipped, or separated, and other steps may be added. Other embodiments are described as example variations of the illustrative embodiment.

As described above, the application 12b is installed on the terminal 10. However, in other embodiments, for example, the display device on which the application 12b is to be installed might not be limited to the terminal 10, but may comprise an information processing device, such as a personal computer, a tablet-type terminal, and a digital camera. As described above, the terminal 10 and the MFP 30 are independent from each other. However, in other embodiments, for example, any device having a printing function, e.g., a single-function device such as a printing device, and a multifunction device having multiple functions including the printing function, may be used as the terminal 10. As described above, the Android™ OS may be the OS 12a installed on the terminal 10. However, in other embodiments, for example, another OS may be available for the OS 12a.

As described above, the Excel® file is illustrated as a file to be uploaded to the conversion server 100 by the terminal 10 and to be converted into one or more image files. Additionally, or alternatively, aspects of the disclosure may be applied to a case where, for example, a file of another type, e.g., a PDF file, that is to be uploaded to the conversion server 100 for conversion into one or more image files representing respective pages. As described above, the conversion server 100 is configured to convert the Excel® file received from the terminal 10 into image files representing respective pages of the Excel® file. However, in other embodiments, for example, the aspects of the disclosure may be applied to a case where, for example, the conversion server 100 converts each sheet of a file, e.g., each worksheet of an Excel® file, received from the terminal 10, into an image file representing all of the pages of that sheet. For another example, the aspects of the disclosure may be applied to a case where, for example, there are multiple sheets in a single Excel® file. In this case, if a user selects a particular sheet, the conversion server 100 might only convert the particular sheet into a plurality of image files representing respective pages of that sheet, and thus, the terminal 10 may download the plurality of image files representing the particular sheet. As described above, an image file is illustrated as a file obtained through conversion performed by the conversion server 100. However, in other embodiments, for example, the aspects of the disclosure may be applied to a case where, for example, the conversion server 100 converts a file into a file other than an image file, e.g., a text file representing a page.

As described above, the aspects of the disclosure are applied to the case where the conversion server 100 converts an Excel® file into image files. However, in other embodiments, for example, the aspects of the disclosure may also be applied to a case where the CPU 11 executes the application 12b to convert various files, e.g., an Excel® file or files other than an Excel® file, into image files, without using the conversion server 100. In this case, for example, the "PRINT" button 83 may be configured to become enabled on condition that one or more image files selected by the user as print targets are prepared when the CPU 11 converts Excel® file into one or more image files representing respective pages.

As described above, the disabled "PRINT" button 83 is displayed until a preparation of all image files representing respective pages selected as print targets is completed, and the "PRINT" button 83 becomes enabled on condition that all the image files representing the print target pages are prepared. That is, as described above, the display of the "PRINT" button 83 enabled in step S312 is an example of a predetermined output involved with printing. Instead of that example, in other embodiments, for example, the "PRINT" button 83 might not be displayed until a preparation of all image files representing the print target pages is completed, and the enabled "PRINT" button 83 may be displayed on condition that all the image files representing the print target pages are prepared. In this case, also, the display of the enabled "PRINT" button 83 may be an example of the predetermined output involved with printing. In this case, in step S319, the "PRINT" button 83 may be removed (e.g., made to disappear) as opposed to being disabled or grayed out.

In other embodiments, for example, the printing execution process (e.g., step S326) may be performed on condition that a preparation of all the image files representing the print target pages is completed. More specifically, the CPU 11 may be configured to transmit, to the MFP 30, print data based on the prepared image files (e.g., the image files selected as print targets), without displaying the "PRINT" button 83, that is, without accepting an user's operation performed onto the "PRINT" button 83, on condition that a preparation of all the image files representing the print target pages is completed. In this case, the transmission of print data may be an example of the predetermined output involved with printing.

As described above, when an image file representing the state-changed page has not been received yet and the page is unselected (e.g., the state of the page is changed to the unselected state from the selected state), the terminal 10 is configured to transmit, to the conversion server 100, a cancellation instruction to cancel the conversion of the applicable page into an image file. Instead of the cancellation instruction, in other embodiments, for example, the terminal 10 may be configured to transmit, to the conversion server 100, an instruction to convert the one or more other pages into one or more image files with higher priority. With this configuration, the one or more pages selected as print targets have higher priority than the page that is the target of cancellation, thereby enabling earlier completion of a preparation of the image files desired to be prepared (e.g., the image files selected as print targets).

In other embodiments, instead of the cancellation instruction, for example, the terminal 10 may be configured to transmit, to the conversion server 100, an instruction for not allowing the conversion server 100 to transmit the image file representing the page whose state has been changed to the unselected state. When the conversion server 100 receives such an instruction, the conversion server 100 may convert all pages of an uploaded file into image files and store the obtained image files therein but might not transmit the image file representing the page subjected to the instruction. With this configuration, the terminal 10 may receive one or more image files required to be prepared, with first priority, thereby enabling earlier completion of a preparation of the one or more image files required to be prepared. The conversion server 100 may reserve all the image files representing all the pages obtained through the conversion. Thus, the terminal 10 may download an image file representing an unreceived page without uploading the Excel® file again to the conversion server 100.

As described above, when an image file representing the state-changed page has not been received yet and the page is selected as a print target this time (e.g., the state of the page is changed to the selected state from the unselected state), the terminal 10 may be configured to transmit a particular page conversion instruction to convert a particular page into an image file on condition that a cancellation instruction to cancel the conversion of the applicable page has been outputted to the conversion server 100. However, in other embodiments, for example, the terminal device 10 may be configured to transmit a particular page conversion instruction regardless of whether a cancellation instruction has been outputted.

As described above, in step S309, a thumbnail image 84 may be displayed only when the image file received from the conversion server 100 is the image file representing the page selected as a print target. However, in other embodiments, for example, a thumbnail image 84 may be displayed regardless of whether or not the image file received from the conversion server 100 is the image file representing the page selected as a print target.

As described above, after all the pages represented by the image files obtained through conversion are selected as print targets in step S306, the terminal 10 may transmit an all-pages conversion instruction to the conversion server 100 in step S307. Instead of that example, in other embodiments, for example, the terminal 10 may be configured to accept a selection for selecting one or more pages as print targets by the user and transmit a particular page conversion instruction to convert the one or more particular pages (e.g., the one or more user-selected pages) without selecting all the pages represented by the image files obtained through conversion. For another example, after the terminal 10 accepts a selection for selecting one or more pages as print targets by the user, the terminal 10 may be configured to transmit a particular page conversion instruction to convert the one or more particular pages to the conversion server 100 on condition the terminal 10 accepts a predetermined finalizing operation performed by the user. For another example, the terminal 10 may be configured to transmit an all-pages conversion instruction to the conversion server 100 and then accept a selection for selecting one or more pages as print targets, without selecting all the pages represented by the image files obtained through conversion.

As described above, the state change of a print target between the selected state and the unselected state is performed on a page basis in accordance with the predetermined operation performed on an area within a thumbnail box 81. However, in other embodiments, for example, an all-select button may be provided to select all the pages as print targets at once when the all-select button is operated. An all-cancel button may also be provided to unselect all the pages at once. When the all-cancel button is operated, all the pages may be unselected at once. For another case, a page whose state is to be changed (e.g., a page to be selected as a print target or to be unselected) may be designated with a numeric value that specifies a page number.

As described above, the CPU 11 is configured to perform the process steps depicted in FIG. 3. However, in other embodiments, for example, a plurality of CPUs may perform the process steps depicted in FIG. 3 in cooperation with each other. A single integrated circuit, for example, a special application specific integrated circuit ("ASIC") or a plurality of integrated circuits may perform the process steps depicted in FIG. 3 independently or in cooperation with each other. Further, a combination of the CPU 11 and one or more integrated circuits, for example, ASIC, may perform the process steps depicted in FIG. 3 in cooperation with each other.

What is claimed is:

1. A non-transitory computer-readable storage medium storing computer-readable instructions that, when executed by an apparatus, cause the apparatus to: transmit, to a server, a first file in a first format, the first file comprising a plurality of pages of a document;
   in response to transmitting the first file to the server, display an option in a disabled state, the option configured to cause a printer to begin image formation when selected;
   after transmitting the first file to the server and while the server converts the first file to a plurality of second files, each second file being in a second format different from the first format, receive at least one user input selecting a plurality of selected pages among the plurality of pages of the first file;
   prior to receiving all of the plurality of second files from the server, determine whether all second files corresponding to the plurality of selected pages have been received, wherein the second files of the selected pages is a subset of the plurality of second files;
   in response to determining that all of the second files of the selected pages have been received, enable the option;
   in response to determining that less than all of the second files of the selected pages have been received, disable the option if the option is enabled; and
   in response to selection of the option when the option is enabled, output the second files of the selected pages to the printer which is responsive to determining that all of the second files of the selected pages have been received, the output of the second files configured to cause the printer to print the second files of the selected pages.

2. The non-transitory computer-readable storage medium according to claim 1, wherein the server is remote from the apparatus.

3. The non-transitory computer-readable storage medium according to claim 1, wherein the plurality of second files is generated as a result of converting the first file.

4. The non-transitory computer-readable storage medium according to claim 1,
   wherein the plurality of selected pages are in a selected state at a same time,
   wherein determining that all of the second files corresponding to the selected pages have been received comprises determining, for each of the plurality of selected pages that are in the selected state, that a corresponding second file, among the plurality of second files, has been received.

5. The non-transitory computer-readable storage medium according to claim 1, wherein the computer-readable storage medium stores computer-readable instructions that, when executed by the apparatus, further cause the apparatus to:
   obtain a number of the plurality of second files prior to receiving the plurality of second files.

6. The non-transitory computer-readable storage medium according to claim 5, wherein the computer-readable storage medium stores computer-readable instructions that, when executed by the apparatus, further cause the apparatus to:
   display, upon obtaining the number of the plurality of second files, a screen comprising images that represent each of the plurality of second files and that, when selected, identify a corresponding one of the plurality of second files as one of the second files corresponding to the selected pages.

7. The non-transitory computer-readable storage medium according to claim 1, wherein the computer-readable storage medium stores computer-readable instructions that, when executed by the apparatus, further cause the apparatus to:
   receive a second file of the plurality of second files;
   determine whether the received second file corresponds to one of the selected pages;
   in response to determining that the received second file corresponds to one of the selected pages, display, upon receiving the corresponding second file, a thumbnail image corresponding to the received second file; and
   in response to determining that the received second file does not correspond to one of the selected pages, not displaying the thumbnail image corresponding to the received second file.

8. The non-transitory computer-readable storage medium according to claim 1, wherein the computer-readable storage medium stores computer-readable instructions that, when executed by the apparatus, further cause the apparatus to:
   provide a cancel instruction, identifying a particular file among the plurality of second files, to cancel conversion with respect to the particular file.

9. The non-transitory computer-readable storage medium according to claim 1, wherein the computer-readable storage medium stores computer-readable instructions that, when executed by the apparatus, further cause the apparatus to:
   change a state of a particular file, among the plurality of second files, in response to a user selection of a particular page corresponding to the particular file;
   determine whether the apparatus has the particular file upon changing the state of the particular file;
   after determining that the apparatus does not have the particular file, output a conversion instruction, identifying the particular file, to request the particular file if the state of the particular file is a selected state; and
   after determining that the apparatus does not have the particular file, output a cancel instruction, identifying the particular file, to cancel conversion with respect to the particular file if the state of the particular file is an unselected state.

10. An apparatus, comprising:
    at least one processor; and
    memory storing computer-readable instructions that, when executed by the at least one processor, cause the apparatus to:
    transmit, to a server, a first file in a first format, the first file comprising a plurality of pages of a document;
    in response to transmitting the first file to the server, display an option in a disabled state, the option configured to cause a printer to begin image formation when selected;
    after transmitting the first file to the server and while the server converts the first file to a plurality of second files, each second file being in a second format different from the first format, receive at least one user input for selecting a plurality of selected pages among the plurality of pages of the first file;
prior to receiving all of the plurality of second files from the server, determine whether all second files corresponding to the plurality of selected pages have been received, wherein the second files corresponding to the plurality of selected pages is a subset of the plurality of second files;
in response to determining that all of the second files corresponding to the plurality of selected pages have been received, enable the option;
in response to determining that less than all of the second files corresponding to the plurality of selected pages have been received, disable the option if the option is enabled; and in response to selection of the option when the option is enabled, output the
plurality of selected second files to the printer which is responsive to determining that all of the second files corresponding to the plurality of selected pages have been received, the output of the plurality of selected second files configured to cause the printer to print the selected second files.

11. The apparatus of claim 10, further comprising:
a display,
wherein the memory further stores computer-readable instructions that, when executed by the at least one processor, further cause the apparatus to:
display, on the display, a thumbnail image for each of the plurality of second files in response to receiving the plurality of second files.

12. The apparatus of claim 10, further comprising:
a communication port,
wherein receiving the plurality of second files comprises receiving, through the communication port, the plurality of second files from the server that is remote from the apparatus.

13. The apparatus of claim 10,
wherein the memory stores computer-readable instructions that, when executed, further cause the apparatus to convert a third file in the first format into a plurality of fourth files in the second format.

14. The apparatus of claim 10,
wherein the plurality of selected pages are in a selected state at a same time,
wherein determining that all of the plurality of selected second files have been received comprises determining, for each of the plurality of selected pages that are in the selected state, that a corresponding second file, among the plurality of second files, has been received.

15. The apparatus of claim 10, further comprising:
a display;
wherein the memory stores computer-readable instructions that, when executed, further cause the apparatus to:
obtain a number of the plurality of second files prior to receiving the plurality of second files; and
upon obtaining the number of the plurality of second files, display a screen on the display, the screen comprising images that represent each of the plurality of second files and that, when selected, identify a corresponding one of the plurality of second files as one of second files corresponding to the plurality of selected pages.

16. An apparatus, comprising:
a communication port;
at least one processor; and
memory storing computer-readable instructions that, when executed by the at least one processor, cause the apparatus to:
receive, via the communication port, a first file from a device remote from the apparatus, the first file comprising a plurality of pages;
determine a number of pages of the first file in response to receiving the first file; transmit the
number of pages of the first file to the device prior to initiating a transmission process;
initiate a conversion process in which the plurality of pages of the first file are converted, in a first order, into a plurality of second files corresponding to the plurality of pages, respectively, wherein, in the first order, a first page of the first file is to be printed before a second page of the first file;
initiate the transmission process in which the plurality of second files are to be transmitted, one by one, to the device;
receive, from the device, an instruction to cancel conversion of the first page of the plurality of pages, the instruction being received after the first file has already been received and the conversion process has been initiated;
after the conversion process of the first file in the first order is initiated and in response to receipt of the cancel instruction:
change the first order to a second order in which the second page is to be converted into a corresponding one of the plurality of second files before converting the first page of the first file, wherein the first page precedes the second page within the first file;
convert the second page prior to converting the first page;
cancel transmission, to the device, of one of the second files corresponding to the first page; and
transmit, other than the one of the second files corresponding to the first page, a remainder of the plurality of second files, one by one, to the device.

* * * * *